United States Patent
Parkar et al.

(10) Patent No.: US 11,983,973 B2
(45) Date of Patent: May 14, 2024

(54) SYSTEM AND SCANNING DEVICE FOR GRANTING USER ACCESS USING A BLUETOOTH LOW ENERGY (BLE) MESH

(71) Applicant: MRINQ TECHNOLOGIES LLP, Goa (IN)

(72) Inventors: Rohin Parkar, Goa (IN); Malcolm Dsouza, Goa (IN); Aniket Shet, Gao (IN); Xavier Gonsalves, Goa (IN)

( * ) Notice: Subject to any disclaimer, the term of this patent is extended or adjusted under 35 U.S.C. 154(b) by 2 days.

(21) Appl. No.: 17/270,508

(22) PCT Filed: Aug. 22, 2019

(86) PCT No.: PCT/IB2019/057077
§ 371 (c)(1),
(2) Date: Feb. 23, 2021

(87) PCT Pub. No.: WO2020/039382
PCT Pub. Date: Feb. 27, 2020

(65) Prior Publication Data
US 2021/0350640 A1    Nov. 11, 2021

(30) Foreign Application Priority Data
Aug. 23, 2018 (IN) .............................. 201821031656

(51) Int. Cl.
*G07C 9/00* (2020.01)
*H04B 17/318* (2015.01)
(Continued)

(52) U.S. Cl.
CPC ....... *G07C 9/00309* (2013.01); *H04B 17/318* (2015.01); *H04W 4/80* (2018.02); *G07C 2009/00769* (2013.01); *H04W 84/18* (2013.01)

(58) Field of Classification Search
CPC ...... G07C 9/00309; G07C 2009/00769; G07C 9/00571; G07C 2209/63; H04B 17/318;
(Continued)

(56) References Cited

U.S. PATENT DOCUMENTS

2013/0090744 A1* 4/2013 Tran ...................... H04L 12/282
700/9
2015/0302188 A1* 10/2015 Potbhare ............... H04L 9/3234
713/185
(Continued)

*Primary Examiner* — An T Nguyen
(74) *Attorney, Agent, or Firm* — Kattina V. Barsik, Esq.

(57) ABSTRACT

The present disclosure relates to the field of lighting and more specifically, to a Bluetooth low energy mesh enabled adaptive light emitting diode (LED) driver with wireless battery powered switches for lighting control. In an aspect, the LED driver can include a rectifier (104); a switch mode power supply (106), a wireless Bluetooth and microcontroller board (110) and a portable wireless switch (506). The rectifier (104) can convert AC mains (102) to a DC level. The switch mode power supply circuit (106) can supply a constant voltage output followed by a constant current supply (108) for the LED load. The wireless Bluetooth module (110) can be connected in a mesh topology to other LED drivers, wireless switches and the smartphone. The microcontroller circuit (110) can enable the user to adjust the current level supplied to the LED Load using both analogue and PWM dimming techniques (112).

16 Claims, 7 Drawing Sheets

(51) Int. Cl.
*H04W 4/80* (2018.01)
*H04W 84/18* (2009.01)

(58) Field of Classification Search
CPC ....... H04W 4/80; H04W 84/18; H04W 12/06; H04W 40/12; H04W 40/16; H04W 40/24; H04W 12/08; Y02D 30/70
See application file for complete search history.

(56) References Cited

U.S. PATENT DOCUMENTS

2015/0341331 A1* 11/2015 Weksler .............. H04L 63/1433
 726/4
2016/0292938 A1* 10/2016 Zakaria .............. G07C 9/00309
2019/0272690 A1* 9/2019 Kaye ....................... H04W 4/80

* cited by examiner

SYSTEM AND SCANNING DEVICE FOR GRANTING USER ACCESS USING A BLUETOOTH LOW ENERGY (BLE) MESH

TECHNICAL FIELD

The present disclosure relates to the field of lighting and more specifically, to a mesh enabled adaptive light emitting diode (LED) driver with wireless battery powered switches for lighting control.

BACKGROUND

Background description includes information that may be useful in understanding the present invention. It is not an admission that any of the information provided herein is prior art or relevant to the presently claimed invention, or that any publication specifically or implicitly referenced is prior art.

At present, new lighting technologies, such as light emitting diodes (LEDs) or compact fluorescent lamps (CFLs), are entering the market at a rapid pace. Light-emitting-diode (LED) lamps offer long service life and high energy efficiency. While initial costs are currently higher than those of fluorescent and incandescent lamps, prices are expected to fall dramatically in the coming years. LED lamps are now made to replace screw-in incandescent or compact fluorescent light bulbs. Most LED lamps replace incandescent bulbs rated from 5 to 60 watts, though again, much higher wattages and brightness are anticipated. Incandescent bulbs have a typical life of 1,000 hours, compact fluorescents about 8,000 hours. LED bulbs are more power-efficient than compact fluorescent bulbs and offer lifespans of 30,000 or more hours, reduced if operated at a higher temperature than specified. Indeed, the higher purchase cost compared to other types of bulbs may already be more than offset by savings in energy and maintenance. LED bulbs maintain output light intensity well over their lifetimes, and they are also mercury-free, unlike fluorescent lamps. LED lamps are also available with a variety of colour properties. Several companies offer LED lamps for general lighting purposes. The technology is improving rapidly, and new energy-efficient consumer LED lamps are available. Some models of LED bulbs work with dimmers of the type used for incandescent lamps.

Due to increasing energy regulations, most people are familiar with the long-life spans and energy savings associated with LEDs, or light-emitting diodes. However, several users are not aware that these innovative light sources use specialized devices called LED drivers to operate. LED drivers (also known as LED power supplies) are similar to ballasts for fluorescent lamps or transformers for low-voltage bulbs: they provide LEDs with the correct power supply to function and perform at their best.

As LEDs are designed to run on low voltage (12-24V), direct current electricity. However, most places supply higher voltage (120-277V), alternating current electricity. An LED driver's main purpose is to rectify higher voltage, alternating current to low voltage, direct current. LED drivers also protect LEDs from voltage or current fluctuations. An LED driver is an electrical device which regulates the power to an LED or a string (or strings) of LEDs. The LED driver responds to the changing needs of the LED, or LED circuit, by providing a constant quantity of power to the LED as its electrical properties change with temperature. The LED driver is a self-contained power supply which has outputs that are matched to the electrical characteristics of the LEDs. LED drivers may offer dimming by means of pulse width modulation circuits and may have more than one channel for separate control of different LEDs or LED arrays. The power level of the LED is maintained constant by the LED driver as the electrical properties change throughout the temperature increases and decreases seen by the LEDs. Without the proper driver, the LED may become too hot and unstable, therefore causing poor performance or failure.

Evidently, advancements in modern technology have led to the development of lighting control or LED that provides different kind of lighting control system. However, conventional 0-10V dimmable drivers are available commercially but they only provide analogue dimming and are wired lighting systems. Further, conventional DALI protocol based dimmable LED drivers provide only dimming feature but again this too is a wired solution and can support only 64 devices max at once. Furthermore, conventional lighting systems are other wireless systems but operates only on different Radio Frequency hence cannot be configured directly via a smartphone. Additionally, in the market there is no optimal solution for dimming of LED lights as the available solutions have some kind of limitation as in linearity of dimming or range of dimming etc. In addition, in the market there is no mesh network topology available on Bluetooth Low Energy that enables the creation of large-scale device networks and can be used for controlling, monitoring, and automation systems.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

Objects

A general object of the present disclosure is to provide a system for wireless control of LED lamps.

Another object of the present disclosure is to provide a system for LED lighting controllable remotely by smart devices.

Another object of the present disclosure is to provide a system for LED lighting capable of remembering previous configured settings.

Another object of the present disclosure is to provide a LED driver circuit for wireless control of LED lamps.

SUMMARY

The present disclosure relates generally to the field of wireless control of switches. In particular, the present disclosure relates to smart control of switches using a Bluetooth low energy (BLE) Mesh.

In an aspect, the present disclosure provides a system to power electric loads. The system can include one or more driver circuits configured to allow flow of current to one or more loads. Each driver circuit can include: a voltage unit configured to receive an input voltage and provide one or more voltage outputs at a predetermined voltage value; and a current unit configured to receive any of the one or more output voltages and provide an output current to the load at a predetermined current value. The system can include a control unit operatively coupled to the one or more driver circuits via a Bluetooth Low Energy (BLE) Mesh comprising one or more processors operatively coupled with a memory, said memory storing instructions executable by the one or more processors to: detect, at a predetermined proximity to any of the one or more driver circuits, one or more BLE enabled devices operatively coupled to the BLE Mesh; and receive, from a BLE enabled device at the predetermined proximity to the any of one or more driver circuits, a dimming signal pertaining to any or a combination of a maximum threshold for output current and a pulse-width modulation rate for the output current. The control unit can be configured to operate the corresponding current unit of the any of one or more driver circuits to allow flow of current to the one or more loads.

In an embodiment, the received dimming signal from the BLE enabled device to a corresponding any one or more driver circuits is stored in a memory device operatively coupled to the control unit.

In another embodiment, for a first time, for each BLE enabled device, a threshold value of received signal strength indicator (RSSI) for the predetermined proximity from the any of one or more driver circuits is determined, and wherein the threshold value of RSSI for the BLE enabled device for a corresponding any of one or more driver circuits is stored in the memory device operatively coupled to the control unit.

In another embodiment, the dimming signal is received from the any of one or more BLE enabled devices.

In another embodiment, the dimming signal for a BLE device is received from the memory device.

In another embodiment, each of the one or more driver circuits is coupled with any of one or more loads and operable to allow flow of current to the corresponding one or more loads.

In another embodiment, the driver circuit comprises a monitoring unit operatively coupled to the control unit and configured to provide a feedback signal pertaining to any or a combination of instant values of output voltage and output current in the driver circuit. In another embodiment, the control unit instructs the current unit to vary output current such that a ratio of instant output current to instant output voltage is approximately the ratio of the predetermined values of output current to output voltage.

In another embodiment, the electric loads are one or more light emitting diodes (LEDs).

In an aspect, the present disclosure provides a driver circuit to power electrical loads, which can include: a voltage unit configured to receive an input voltage and provide one or more voltage outputs at a predetermined voltage value; and a current unit configured to receive any of the one or more output voltages and provide an output current to the load at a predetermined current value. The system can include a control unit operatively coupled to a Bluetooth Low Energy (BLE) Mesh comprising one or more processors operatively coupled with a memory, said memory storing instructions executable by the one or more processors to: detect, at a predetermined proximity to the driver circuit, one or more BLE enabled devices operatively coupled to the BLE Mesh and associated with a corresponding one or more users; and receive, from a BLE enabled device at the predetermined proximity to the driver circuit, a dimming signal pertaining to any or a combination of a maximum threshold for output current and a pulse-width modulation rate for the output current. The control unit can be configured to operate the current unit of the driver circuit to allow flow of current to the one or more loads.

In an embodiment, the received dimming signal from the BLE enabled device to the driver circuit is stored in a memory device operatively coupled to the control unit.

In another embodiment, for a first time, for the BLE enabled device, a threshold value of received signal strength indicator (RSSI) for the predetermined proximity from the driver circuit is determined, and wherein the threshold value of RSSI for the BLE enabled device for the driver circuit is stored in the memory device operatively coupled to the control unit.

In another embodiment, the dimming signal is received from the any of one or more BLE enabled devices.

In another embodiment, the dimming signal for a BLE device is received from the memory device.

In another embodiment, the driver circuit is coupled with any of one or more loads and operable to allow flow of current to the corresponding one or more loads.

In another embodiment, the driver circuit comprises a monitoring unit operatively coupled to the control unit and configured to provide a feedback signal pertaining to any or a combination of instant values of output voltage and output current in the driver circuit. In another embodiment, the control unit instructs the current unit to vary output current such that a ratio of instant output current to instant output voltage is approximately the ratio of the predetermined values of output current to output voltage.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings are included to provide a further understanding of the present disclosure and are incorporated in and constitute a part of this specification. The drawings illustrate exemplary embodiments of the present disclosure and, together with the description, serve to explain the principles of the present disclosure.

DETAILED DESCRIPTION

Figure 1:
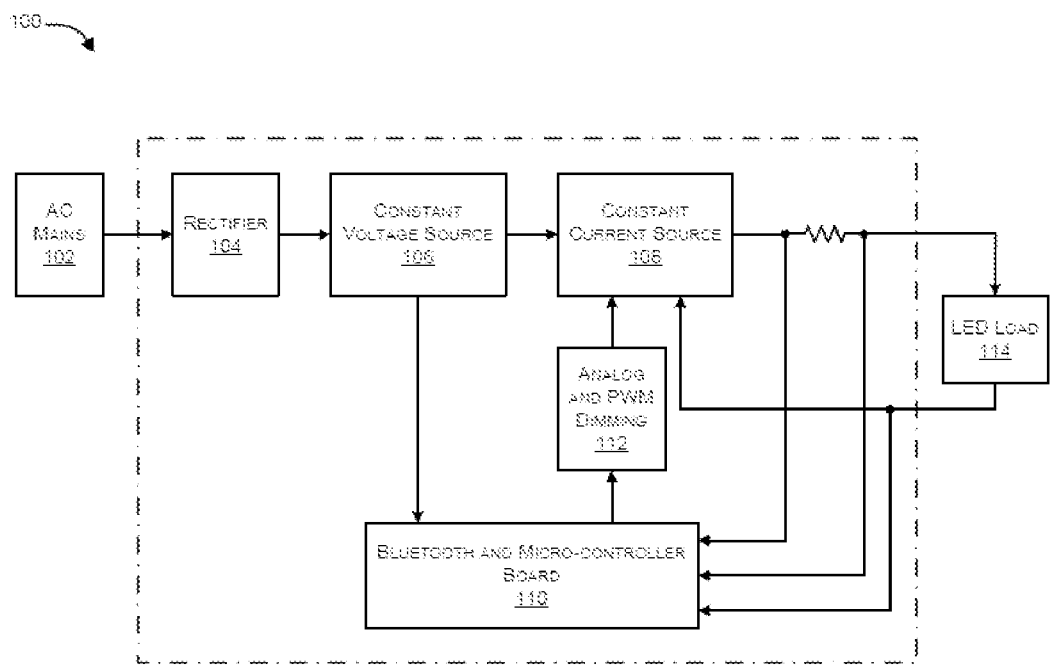
FIG. 1 illustrates a block diagram of LED Driver, in accordance with an exemplary embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein. Various modifications will be readily apparent to persons skilled in the art. The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

The present invention provides a technical solution in the form of a wireless adaptive light emitting diode driver (hereinafter interchangeably referred to as "adaptive LED driver" or "proposed LED driver" or "LED driver") that can supply a constant current output to any LED load by smartly finding the optimum current required by the LED load making the LED load last longer. The setup can include stacked layers of a constant current source over a constant voltage source which inherently provides over voltage and over current protection. A combinational dimming feature of analogue and pulse width modulation (PWM) both is implemented which allows the maximum current of the driver to be set at any value and PWM dimming can be performed on this current level wirelessly which makes it possible for a single unit of this LED driver to work for a wide variety of LED load without changing the driver's configuration. The LED drivers can be connected to wireless switches, smart phone and each other via a Bluetooth Low Energy (BLE) mesh network and the range of operation can be controlled by a received signal strength indicator (RSSI) provisioning in the smartphone application. The battery-operated wireless switches can toggle and dim the LED lights which will be placed on the AC outlet panel. The same function can be performed through a smart phone via an application for this purpose. The application can allow a user to set scenes for a room (for example in a scheduler mode) which can be saved and used again by just tapping a button in the smartphone application. Also, the scene can be changed or set to change when any person enters in the room. Further, the application can allow a user to control scenes for a room using motion sensors or gesture based. Furthermore, the driver can be operated over the internet using a Wi-Fi router. These LED drivers can be setup without changing any wires or configuration of the lighting system. The present embodiment operates on universal input voltage range i.e. 85Vac-265Vac.

Accordingly, an aspect of the present disclosure relates to a LED driver. The LED driver can include a rectifier, a switch mode power supply, a wireless Bluetooth module, a microcontroller circuit and a portable wireless switch. The rectifier can convert AC mains to a DC level. The switch mode power supply circuit can supply a constant voltage output followed by a constant current supply circuit for the LED load. The wireless Bluetooth module can be connected in a mesh topology to other LED drivers, wireless switches and the smartphone. The microcontroller circuit can enable the user to adjust the current level supplied to the LED Load using both analogue and PWM dimming techniques. The device i.e. a portable wireless switch can enable the user to remotely adjust the brightness of the LED loads.

In an aspect, the LED driver can include a dual voltage switch mode power supply (SMPS) flyback stage from which the higher voltage powers the constant current circuit to drive the LED Load and the second lower voltage output is used for powering the Bluetooth board.

In an aspect, the LED driver can adapt to any LED load's optimum current requirements by means of a control loop which finds the optimal current level with slow increments of load current and remembers this level the next time this LED Load is used.

In an aspect, the LED driver can utilize a combination of analogue and PWM dimming where the analogue dimming allows the max load current to be manipulated and a PWM signal over this helps to adjust the output current from 0% to 100% of the current set by the analogue signal.

In an aspect, the LED driver directly can be connected to a smartphone via the BLE mesh network and allows the user to toggle and adjust the brightness of the LED load on the go.

In an aspect, the LED driver can be connected to battery operated stickable portable wireless switches via the BLE mesh network which can toggle or adjust the brightness of the LED load by click gestures.

In an aspect, the LED driver can include a single battery-operated wireless potentiometer which can toggle and adjust the brightness of all the LED lights in the room.

In an aspect, the LED driver can be password protected access control.

FIG. 1 illustrates a block diagram of LED Driver (100), in accordance with an exemplary embodiment of the present disclosure.

In an embodiment, the LED driver (100) can include a rectifier (104), a constant voltage source (106), a constant current source (108), a Bluetooth and microcontroller board (110), and analogue and PWM dimming circuit (112) (hereinafter interchangeably referred as "analogue and PWM circuitry"). In another embodiment, the rectifier (104) can convert AC mains (102) to a DC level. The switch mode power supply circuit or constant voltage source (106) can supply a constant voltage output followed by a constant current supply (108) for the LED load. In an embodiment, the input for the LED driver (100) can be provided from an alternate to direct voltage converter (ADC).

In an embodiment, the LED driver (100) is capable of operating on a wide range of input voltages, for instance, on a range of about 85-265 V AC. This is made possible by using a flyback converter, which is a power supply topology that uses a mutually coupled inductor to store energy when a current passes through it and releases the energy when the current is stopped. When the current flowing through an inductor is cut off, the energy stored in the magnetic field is released by a sudden reversal of the terminal voltage. If a diode is in place to conduct the stored energy somewhere useful, the diode is called a flyback diode. This only requires one winding on the inductor, which can be referred to as a flyback transformer. The flyback converter transfers energy to the secondary side of the power supply only when the primary switch is off. The basic flyback converter uses a relatively small number of components. A switching device chops the input DC voltage and the energy in the primary is transferred to the secondary through the switching transformer. A diode in the secondary rectifies the voltage while the capacitor smooths the rectified voltage. In a practical circuit, a feedback circuit is used to monitor the output voltage and while a control circuit switching device.

In an embodiment, a constant current source (108) can supply a constant current to the LED array connected at its output. A constant current (CC) converter regulates current, and a control loop adjusts the duty cycle to maintain a constant output current regardless of changes to the input voltage and output resistance. A change in output resistance will cause the output voltage to adjust as the load resistance varies; the higher the output resistance, the greater the output voltage.

The current through an LED is directly proportional to the intensity of brightness it can provide which makes it essential for the current through all the LEDs in the array remain constant which in turn illuminates all LEDs at a same brightness level. The cascaded structure of a constant current source after a constant voltage source inherently provides protection from voltage fluctuations hence increasing LED life cycle.

Life of an LED can also be increased by operating the LED optimally by regulating current required to it. The voltage and current levels are continuously monitored across the LED string by a circuit with a series sense resistor and are converted to digital readings by multiple Analog to Digital Converters (ADC) in order that the microcontroller board (110) can process those readings and take the required actions.

In an embodiment, the Bluetooth and Microcontroller board (110) can provide a wireless control means to the LED Driver via a BLE mesh network. The Bluetooth and microcontroller board (110) can interpret the signals incoming from the wireless switches or a smartphone and controls the Analog and PWM circuitry (112) to manipulate LED array brightness levels. The mesh network allows the LED driver to pass messages to each other and because the messages can be relayed to in such a way between the LED drivers the range of operation can extend in kilometres.

In another embodiment, the LED Driver supports analogue and PWM dimming techniques simultaneously for altering the brightness of the LED array. The analogue dimming is controlled by the resistor-digital potentiometer divider network and PWM dimming is taken care by a PWM signal applied on the base of an open collector transistor. PWM stands for Pulse Width Modulation in which the LED array is turned on and off at fast rate with a variable duty-cycle such that due to the persistence of vision the brightness is perceived as the average on-time of the LED. The human eye has a limit of 60 frames per second. By increasing the frequency to 100 frames per second, one can deceive the eye into believing a pulsing light source is a continuous one.

In an embodiment, the wireless Bluetooth module can be connected in a mesh topology to other LED drivers, wireless switches and the smartphone. The microcontroller circuit can enable the user to adjust the current level supplied to the LED Load using both analogue and PWM dimming techniques (112).

Figure 2:
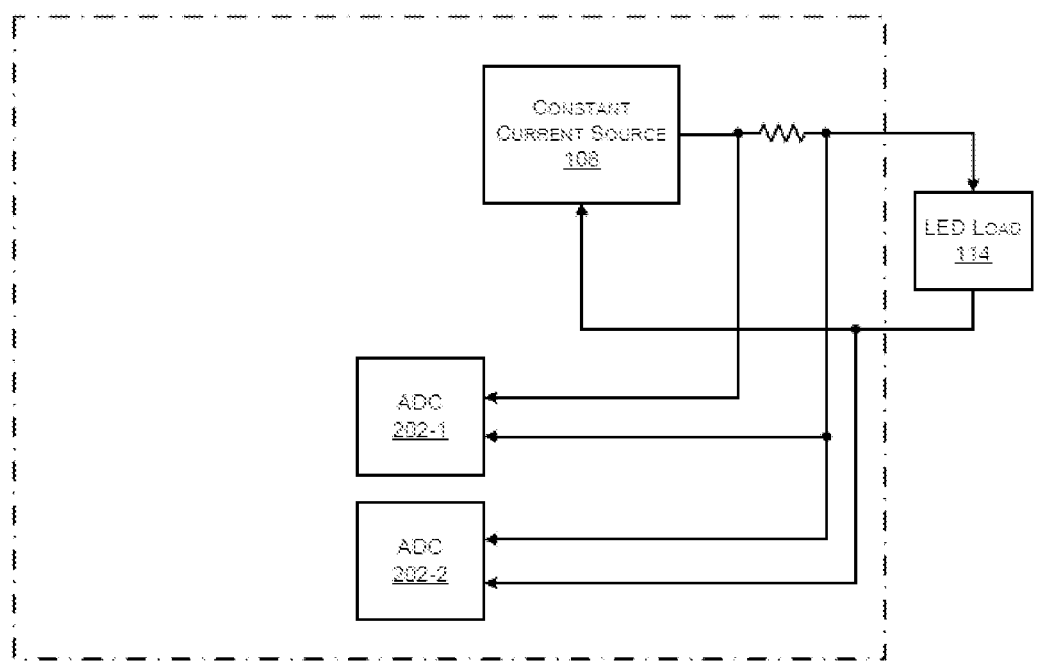
FIG. 2 illustrates analogue to digital converter (ADC) block setup of the Bluetooth low energy (BLE), in accordance with an exemplary embodiment of the present disclosure.

FIG. 2 illustrates analogue to digital converter (ADC) block setup of the Bluetooth low energy (BLE), in accordance with an exemplary embodiment of the present disclosure.

In an embodiment, the voltage and current levels are continuously being monitored across the LED string by a circuit as shown in FIG. 2. As shown in FIG. 2, digital readings can be converted by multiple Analog to Digital Converters (ADC) 202-1 and 202-2 (ADC collectively can be referred as 202) so the microcontroller can process those readings and take the required actions. These levels can be plotted as V-I Characteristics of a LED, using this information the slope of two consecutive readings are taken and compared with a slope threshold level set in the microcontroller. If a slope value equal to the threshold set in the microcontroller is met, then the monitoring of the voltage and current levels across the LED array is terminated as the optimum current requirement for the LED is achieved.

Figure 3:
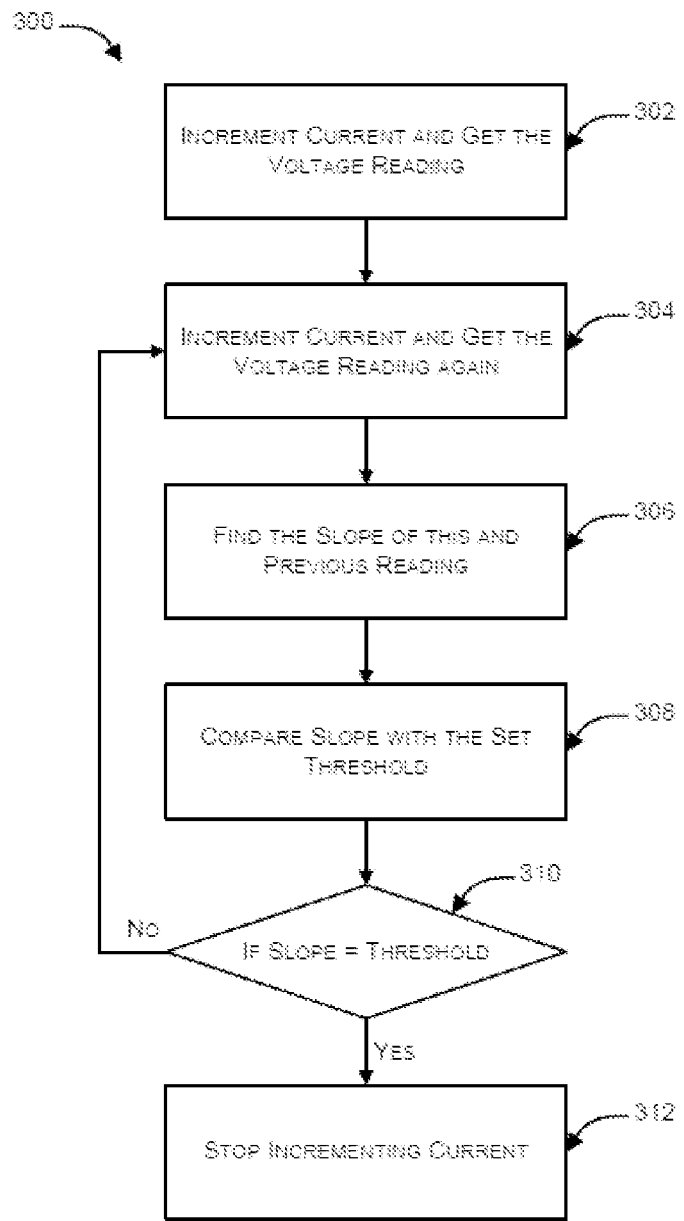
FIG. 3 illustrates a flow chart for adaptive current setting, in accordance with an exemplary embodiment of the present disclosure.

FIG. 3 illustrates a flow diagram (300) for adaptive current setting, in accordance with an exemplary embodiment of the present disclosure.

In an embodiment, life cycle of an LED can also be increased by making the LED operate at its optimum current level. A method which automatically finds the optimum current required by any LED or LED array is proposed for which an algorithm is prescribed as shown in the flow diagram FIG. 3.

At step 302, increment current and get the voltage reading.

At step 304, increment current and get the voltage reading again.

At step 306, find the slope of this and previous reading.

At step 308, compare slope with the set threshold.

At step 310, if the slope is equal to threshold then stop incrementing current or otherwise return to step 306.

Figure 4:
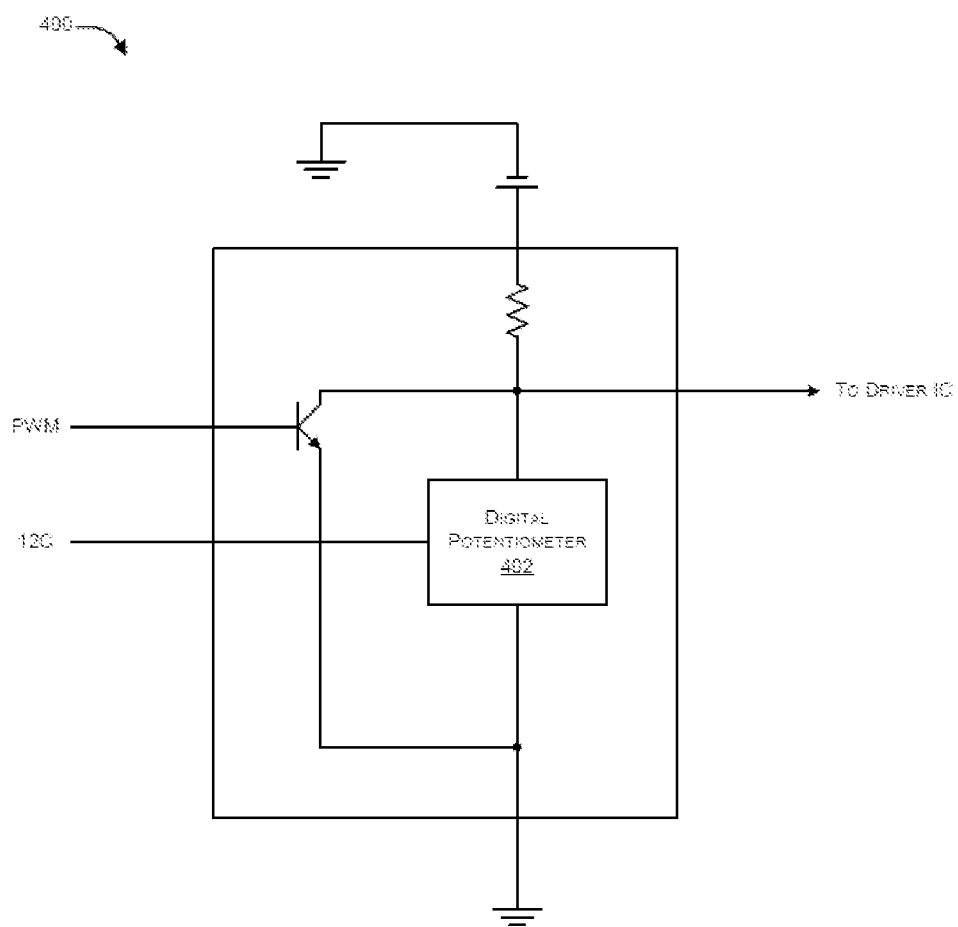
FIG. 4 illustrates a circuit diagram for Analog cum PWM, in accordance with an exemplary embodiment of the present disclosure.

FIG. 4 illustrates a circuit diagram (400) for Analog cum PWM, in accordance with an exemplary embodiment of the present disclosure.

In an embodiment, the LED driver can support Analog cum PWM dimming techniques simultaneously for altering the brightness of the LED array and the circuitry is as shown in FIG. 4. This circuitry presents an intuitive way of controlling the dimming pin of the constant current source IC. The analogue dimming can be controlled by the resistor-digital potentiometer (402) divider network and PWM dimming is taken care by a PWM signal applied on the base of an open collector transistor. The analogue dimming can enable the user to set a specific current level for the LED array to operate at the output and a PWM signal over this enables the user to manipulate the brightness from 0% to the level defined by the analogue dimming setting. This way a single LED Driver can operate with multiple types of LED light fixtures varying in their wattage ratings, and hence erases the need to use different drivers to work with different types of LED light fixtures.

Figure 5A:
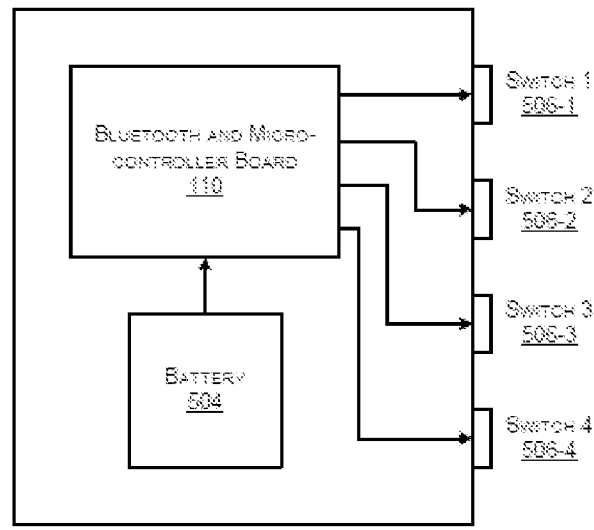
FIGS. 5A and 5B illustrates a block diagram of wireless switches and wireless potentiometer, in accordance with an exemplary embodiment of the present disclosure.
Figure 5B:
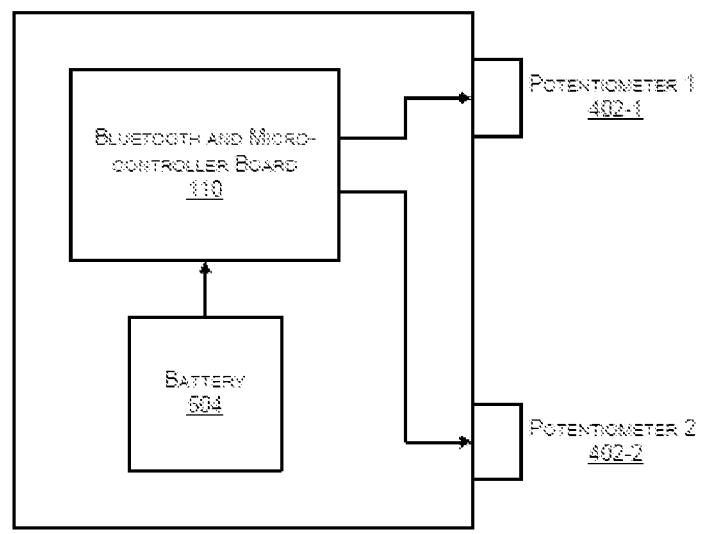

FIGS. 5A and 5B illustrates a block diagram of wireless switches and wireless potentiometer, in accordance with an exemplary embodiment of the present disclosure.

In an embodiment, the LED driver can be operated using stick able battery-operated (504) wireless switches (506-1, 506-2, 506-3, and 506-4) (hereinafter collectively referred as 506) and potentiometers (402-1 and 402-2) (hereinafter collectively referred as 402). A single switch (506) or potentiometer (402) can toggle a particular LED light on/off and also control the brightness levels by long press gestures. In an exemplary embodiment, each switch can contain one or more buttons and hence can control a corresponding one or more LED Drivers or Groups of LED drivers or Scene Settings. These switches can also become part of any Mesh network defined by one or more users. These can be used in direct replacement for the traditional power switches used in homes, hence reducing the need for wires running from the lights to the switches. This saves time and cost for someone who is looking to implement home automation in a new house using these devices. The user can control a light using one button on the switch or the user can assign a group to be controlled to the button or even assign a scene that can be activated on the press of the button or a combination thereof.

Figure 6A:
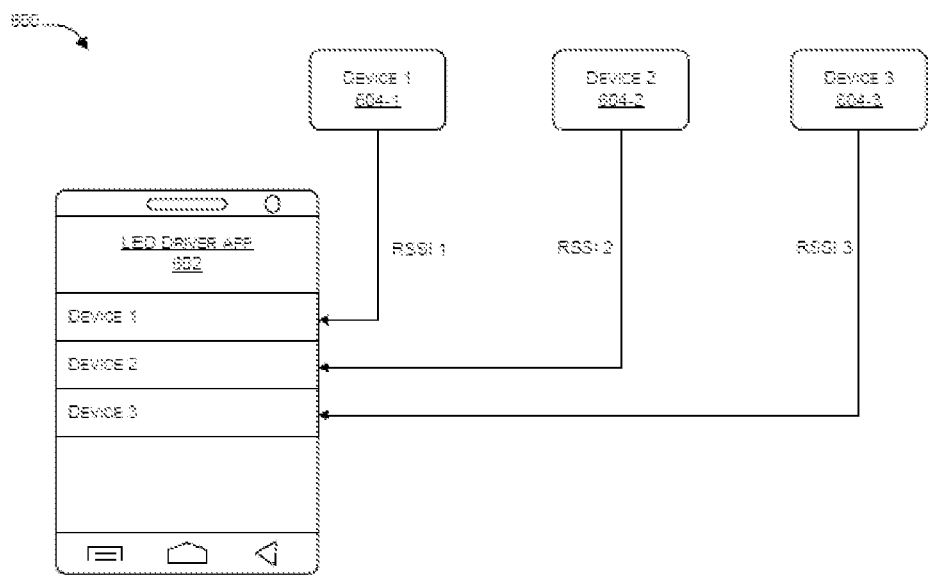
FIGS. 6A and 6B illustrates a Received Signal Strength Indicator (RSSI) based priority order, in accordance with an exemplary embodiment of the present disclosure.
Figure 6B:
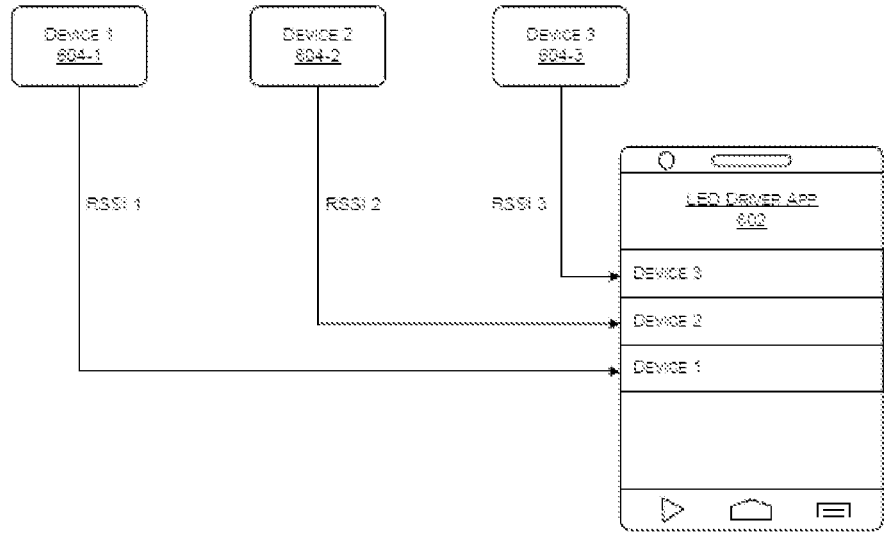

FIGS. 6A and 6B illustrates a Received Signal Strength Indicator (RSSI) based priority order, in accordance with an exemplary embodiment of the present disclosure.

In an embodiment, the smartphone application or LED driver app (602) can allow a user to directly talk and control an LED driver which is in close proximity based on the Received Signal Strength Indicator (RSSI) as shown in FIGS. 6A-B. In an exemplary embodiment, device 1 (604-1) of user 1 (user 1 not shown in FIG. 6) is in close proximity based on the Received Signal Strength Indicator (RSSI) compared with device 2 (604-2) and device 3 (604-3) so LED driver app (602) can directly control device 1. In another example, as shown in FIG. 6B, device 3 (604-3) can be controlled by LED driver app (602) as it is in close proximity based on the Received Signal Strength Indicator (RSSI) compared to other device.

In an embodiment, the applications or LED driver app (602) can support saving the state of an LED light and using these combinations of saved states of all the lights in a room to set Scenes for an occasion or an event. The application can be used only by registered users and also is password protected.

As shown in FIGS. 6A and 6B, the LED driver can include a RSSI based network provisioning system which is used to manipulate the range from which the LED driver can be operated, based on the received signal strength.

Figure 7:
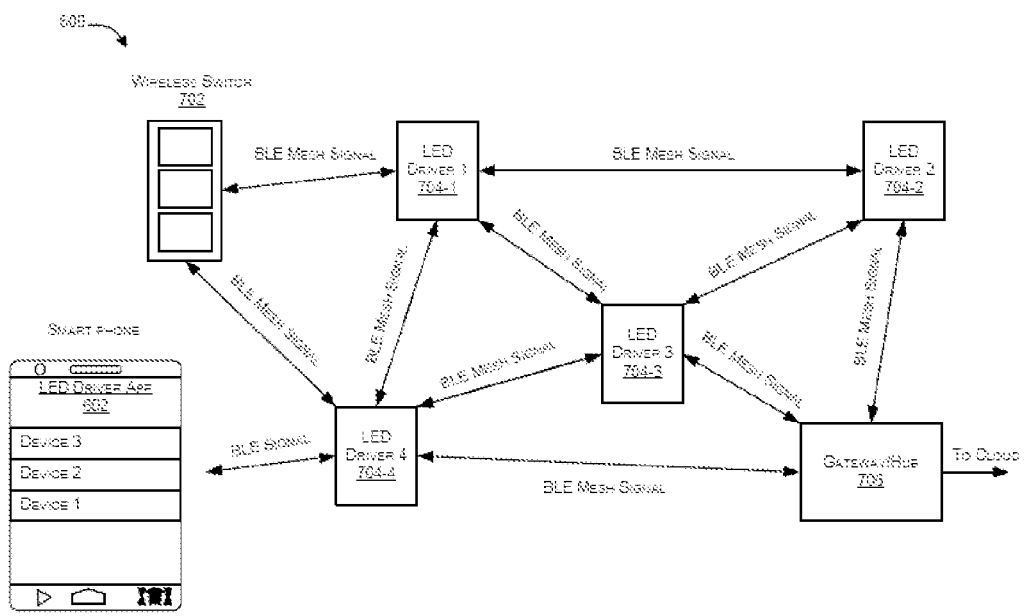
FIG. 7 illustrates a block diagram of mesh, in accordance with an exemplary embodiment of the present disclosure.

FIG. 7 illustrates a block diagram of the BLE mesh, in accordance with an exemplary embodiment of the present disclosure.

The LED drivers (704-1, 704-2, 704-3, 704-4) can be connected in a BLE mesh network with each other and to a gateway/hub (706) for cloud access. A plurality of wireless switches 702 can be coupled to the LED drivers through the BLE Mesh. The one or more switches 702 can be operatively coupled with the exemplary application 602 installed on a BLE enabled device. The switches can be controlled based on input from the application 602. Further, each switch can be configured to power one or more LED drivers such that, actuation of a switch can turn on one LED driver, a group of LED drivers or an LED driver according to a scene.

The present invention, a proposed LED driver can include methods, apparatuses, and associated software (device application) for controlling, programming, and automating one and/or multiple 'Intelligent Illuminating Devices' utilizing a wireless communication protocol executed between one or many wireless devices and one or many Devices. The methods and apparatuses presented here would allow one to adjust and control a single or network of Devices with high flexibility, user control, and intuitive user interaction, with minimal installation or complexity.

It should be apparent to those skilled in the art that many more modifications besides those already described are possible without departing from the inventive concepts herein. The inventive patent matter, therefore, is not to be restricted except in the spirit of the appended claims. Moreover, in interpreting both the specification and the claims, all terms should be interpreted in the broadest possible manner consistent with the context. In particular, the terms "includes" and "including" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practised with modification within the spirit and scope of the appended claims.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Advantages

The present disclosure provides a system for wireless control of LED lamps.

The present disclosure provides a system for LED lighting controllable remotely by smart devices.

The present disclosure provides a system for LED lighting capable of remembering previous configured settings.

The present disclosure provides a LED driver circuit for wireless control of LED lamps.

We claim:

1. A system for granting access to one or more users to one or more areas of interest allowable by a corresponding one or more scanning devices using Bluetooth low energy (BLE) Mesh, said system comprising:
  one or more processors operatively coupled to a memory, said memory storing instructions executable by the one or more processors to:
    receive, at any of one or more scanning devices operatively coupled to the BLE Mesh, a connection from any of one or more BLE enabled devices associated with a corresponding user scanning device scanning device;
    receive, at the any of one or more scanning devices from each connected BLE enabled device, an intent signal associated with a request to grant an access to the corresponding user to a corresponding area of interest allowable through the any of one or more scanning devices;
    determine, at the any of one or more scanning devices, for a first time for each of the connected BLE enabled devices, a threshold value of received signal strength indicator (RSSI) at a predetermined proximity of each of the connected BLE enabled devices from the one or more scanning devices; and
    receive, at a server operatively coupled to the BLE Mesh, information pertaining to a logging data associated with grant of access to the user associated with the any of one or more BLE enabled devices to a corresponding area of interest and the corresponding determined threshold value of RSSI for the any of one or more BLE enabled devices,
  wherein, when the value of RSSI of a BLE enabled device crosses a corresponding determined threshold value, the connection from the BLE enabled device is authenticated to allow the corresponding user access to the corresponding area of interest.

2. The system as claimed in claim 1, wherein the received connection from the any of one or more BLE enabled devices associated with the corresponding user is based on an authentication request sent from the any of one or more scanning devices to the any of one or more BLE enabled devices on a positive detection of BLE beacons from the any of one or more BLE enabled devices.

3. The system as claimed in claim 1, wherein the threshold value for RSSI for a BLE enabled device is computed based on Bluetooth transmitter and receiver characteristics of the BLE enabled device.

4. The system as claimed in claim 1, wherein the logging data is transmitted by the server to the corresponding any of the one or more BLE enabled devices in acknowledgement of grant of access to the corresponding user.

5. The system as claimed in claim 1, wherein the logging data is made available to the any of one or more scanning devices via the BLE Mesh from the any of the one or more scanning devices.

6. The system as claimed in claim 1, wherein the logging data comprises information pertaining to any or a combination of identity of user associated with the any of the one or more authenticated BLE enabled devices, location of the any of one or more scanning devices and a time stamp of grant of access to the corresponding user to the corresponding area of interest.

7. The system as claimed in claim 1, wherein the any of one or more scanning devices is operatively coupled to a locking mechanism of a door, and wherein the scanning device instructs the locking mechanism to open on positive authentication of the any of one or more BLE enabled devices to allow access to the corresponding user to the area of interest.

8. The system as claimed in claim 1, wherein the proximity of each of the connected BLE enabled devices is determined, at the any of one or more scanning devices, based on a rate of change of RSSI from each of the connected BLE enabled devices.

9. A scanning device operatively coupled to a Bluetooth low energy (BLE) Mesh for granting access to one or more users to an area of interest allowable by the scanning device, said scanning device comprising:
  one or more processors operatively coupled to a memory, said memory storing instructions executable by the one or more processors to:
    receive, at the scanning device, a connection from any of one or more BLE enabled devices operatively coupled to the BLE Mesh and associated with a corresponding user;
    receive, at the scanning device from each connected BLE enabled device, an intent signal associated with a request to grant an access to the corresponding user to a corresponding area of interest allowable through the any of one or more scanning devices;
    determine, at the scanning device, for a first time for each of the connected BLE enabled devices, a threshold value of received signal strength indicator (RSSI) at a predetermined proximity of each of the connected BLE enabled devices from the one or more scanning devices; and receive, at a server operatively coupled to the BLE Mesh, information pertaining to a logging data associated with grant of access to the user associated with the any of one or more BLE enabled devices to a corresponding area of interest and the corresponding determined threshold value of RSSI for the any of one or more BLE enabled devices, wherein, when the rate of change of RSSI of a BLE enabled device crosses a corresponding computed predetermined threshold value, the connection from the BLE enabled device is authenticated to allow the corresponding user access to the area of interest.

10. The scanning device as claimed in claim 9, wherein the received connection from the any of one or more BLE enabled devices associated with the corresponding user is based on an authentication request sent from the scanning device to the any of one or more BLE enabled devices on a positive detection of BLE beacons from the any of one or more BLE enabled devices.

11. The scanning device as claimed in claim 9, wherein the threshold value for RSSI for a BLE enabled device is computed based on Bluetooth transmitter and receiver characteristics of the BLE enabled device.

12. The scanning device as claimed in claim 9, wherein one or more second scanning devices are operatively coupled to the BLE Mesh, the one or more second scanning devices configured to allow access to a corresponding one or more second areas of interest.

13. The scanning device as claimed in claim 12, wherein the logging data is made available from the scanning device to the one or more second scanning devices via the BLE Mesh.

14. The scanning device as claimed in claim 9, wherein the logging data comprises information pertaining to any or a combination of identity of user associated with the any of the one or more authenticated BLE enabled devices, location of the scanning device and a time stamp of grant of access to the corresponding user to the area of interest.

15. The scanning device as claimed in claim 9, wherein the scanning device is operatively coupled to a locking mechanism of a door, and wherein the scanning device instructs the locking mechanism to open on positive authentication of the any of one or more BLE enabled devices to allow access to the corresponding user to the area of interest.

16. The scanning device as claimed in claim 9, wherein the proximity of each of the connected BLE enabled devices is determined, at the any of one or more scanning devices, based on a rate of change of RSSI from each of the connected BLE enabled devices.

\* \* \* \* \*